United States Patent [19]

White

[11] 4,407,690
[45] Oct. 4, 1983

[54] PROCESS FOR COATING WEBS WITH POLYETHYLENE

[75] Inventor: George White, Glenburnie, Canada

[73] Assignee: Du Pont Canada Inc., Mississauga, Canada

[21] Appl. No.: 356,718

[22] Filed: Mar. 10, 1982

[30] Foreign Application Priority Data

Mar. 18, 1981 [GB] United Kingdom ............... 8108486

[51] Int. Cl.³ .................... B29C 19/00; B05D 3/12
[52] U.S. Cl. .................... 156/244.27; 427/358; 427/361; 427/365; 427/398.2
[58] Field of Search ............... 427/358, 361, 365, 391, 427/398.2, 389.9, 393.5; 156/244.27

[56] References Cited

U.S. PATENT DOCUMENTS 2,894,853  7/1959  Andersson .
3,456,293  7/1969  De Smedt et al. .
4,133,710  1/1979  Wartenberg .................... 427/365 X

FOREIGN PATENT DOCUMENTS 653596  12/1962  Canada .
1346780  2/1974  United Kingdom ............... 427/365

Primary Examiner—Michael R. Lusignan

[57] ABSTRACT

A process is provided for coating of substrate webs with polyethylene wherein the edge thickening and other processing difficulties caused by the necking-in phenomenon are minimized. The process comprises extruding a polyethylene having a melt index between 30 dg/min and 100 dg/min through a slot in a slotted die in the form of a sheet onto the moving substrate web to form the coated web, and passing the coated web through a nip roll assembly comprising a chill roll and a nip roll, the slotted die having at the extremities of the slot therein edge guides which are maintained at a temperature above the melting temperature of the polyethylene and are contoured to guide the adhered edges of the extruded sheet into the throat of the nip roll assembly.

10 Claims, 4 Drawing Figures

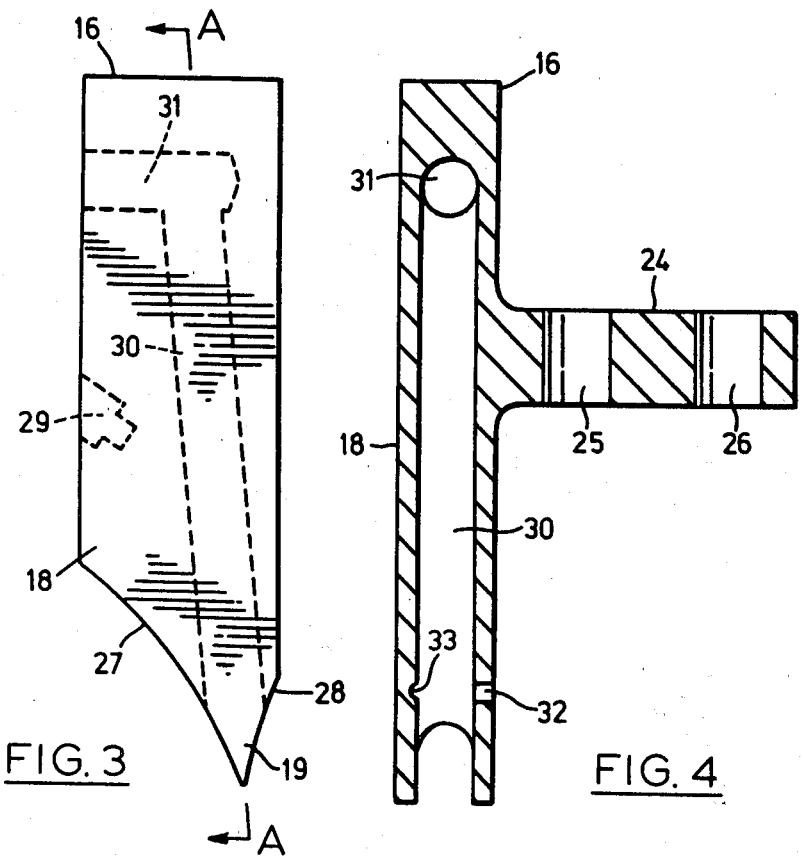

PROCESS FOR COATING WEBS WITH POLYETHYLENE

BACKGROUND

1. Field of the Invention

The present invention relates to coating of substrate webs with polyethylene.

2. Description of the Prior Art

Processes for extrusion coating of substrate webs with polyethylenes are known. One problem, associated with the coating material, which is well recognized in the art, is a phenomenon known as necking-in. Necking-in occurs after the molten polyethylene is extruded through a slotted die. The edges of the molten sheet of polymer have a tendency to move inwardly towards the center of the sheet, thus making the width of the sheet narrower than when it was first extruded from the die slot. As a result of this necking-in, the thickness of the edges of the polymer sheet, when solidified, tends to be greater than that at the center of the sheet. The thickness at the edge may be ten- or twenty-fold that at the center. An objectionable effect of this edge thickening of the coated web is to increase the diameter, at the edges, of a beam wound with the web, which leads to tensioning and wrinkling difficulties.

Several techniques have been used to overcome this objectional phenomenon.

A common method involves trimming the thickened edges from the coated web. This method is wasteful, as in many instances the coating material and the substrate to which it is attached are dissimilar, and recovery of the trimmed coating material and substrate is difficult.

Another method is disclosed in U.S. Pat. No. 2,894,853, issued July 14, 1959 to N. Andersson in which the edge of the substrate web, e.g., paper is thinned by grinding prior to coating the web with the coating material.

Yet another method involves blending polyethylene resins, each having certain desirable properties. Canadian Patent No. 653,596, issued Dec. 4, 1962 to R. T. Buckso, describes such a blend, which comprises 30-70%, by weight, of a polyethylene resin having a density of from 0.92 to 0.945 g/cm$^3$, and a stiffness modulus of about 30,000 to 55,000 psi and a melt index of about 2 to 8 dg/min, and 70-30%, by weight, of a polyethylene resin having density of from 0.95 to 0.97 g/cm$^3$, a stiffness modulus of from about 85,000 to 200,000 psi, an elongation modulus of at least 1,000% at break and a melt index of 1 to about 6 dg/min.

Heretofore, the requirements of a polyethylene coating resin have included the ability to be extruded and drawn down to the substrate web without tearing or substantial necking-in of the molten sheet extrudate. Such requirements are similar to those required for polyethylene resins intended for casting films. Melt flow properties of such polyethylene resins as indicated by melt index, tend to be in the range of 3.5 to 12 dg/min. Polyethylene resins having melt indices of 30 dg/min and above have, heretofore, been believed to be unsuitable for coating processes primarily because when extruded into sheet form such resins neck-in to a much greater degree than do polyethylenes having substantially lower melt indices. As used herein, melt index refers to measurements made according to the procedure of ASTM D-1238 (Condition E).

It is occasionally desirable to impart stiffness to webs. One method for stiffening webs that has been suggested is to coat the web with a high density polyethylene. An added advantage of using a high density polyethylene coating is that high density polyethylenes draw down to a greater extent than do low density polyethylenes. Such greater draw down lends itself to the provision of thinner coatings. In spite of the benefits of greater draw down and a stiffer coated web, high density polyethylenes have not been used on a large commercial scale in extrusion coating processes because of the increased tendency of such extruded resins to neck-in.

The term "draw down" as used herein refers to the ratio of the thickness of the coating material immediately after extrusion from the die slot to that after being laid down on the substrate.

Yet another problem is that in conventional extrusion coating processes where the draw down of the extruded coating material may be as high as 20:1 or higher, the phenomenon of necking-in tends to be more pronounced than in slower speed processes. Coating processes may operate at substrate web speeds of as low as about 50 m/min, higher speed processes are desirable for reasons of productivity, and speeds of 200-400 m/min or higher are not uncommon. Conventional processes tend to be operated at these higher speeds.

It appears that prior processes have not been entirely successful in overcoming the problems associated with the necking-in phenomenon in extrusion coating processes.

It is therefore an object of the present invention to provide an extrusion coating process in which a substrate web may be coated with a polyethylene, and in which the edge thickening is minimized; and in which other processing difficulties caused by the necking-in phenomenon are minimized.

SUMMARY OF THE INVENTION

Accordingly, the present invention provides a process for coating a substrate web with a polyethylene in which process the polyethylene, having a melt index of between about 30 dg/min and about 100 dg/min, is extruded through a slot in a slotted die in the form of a sheet having two edges onto the substrate web being transported past the slotted die, to form a coated web; and subsequently, the coated web is passed through a nip roll assembly comprising a chill roll and a nip roll, which form a throat therebetween, said slot at the extremities thereof having edge guides which are maintained at a temperature higher than the melting temperature of the polyethylene and are adapted to guide the two adhered edges of the extruded sheet into the throat of the nip roll assembly.

In one embodiment, the polyethylene has a melt index between about 50 dg/min and about 85 dg/min, especially between about 50 to about 75 dg/min.

In another embodiment, the polyethylene is a homopolymer of ethylene or a copolymer of ethylene and a higher alpha-olefin, especially linear homopolymers or copolymers, or mixtures thereof. Preferred copolymers are polymers of ethylene and $C_4$-$C_{10}$ alpha-olefins.

In a further embodiment, the edge guides each have a surface extending substantially transversely to and perpendicularly from the slot in the slotted die, with said surfaces facing one another. Preferably, the edge guides each have a surface which is contoured to follow the curvature of the nip roll.

In yet another embodiment, the distance between the contoured surface at the tip of the edge guide and the nip roll is set at between 0.1 cm and 1.0 cm, preferably between 0.2 cm and 0.5 cm.

In another embodiment, the process is operated at substrate web speeds, past the slotted die, greater than about 50 m/min, especially greater than about 200 m/min and, more particularly, between about 200 m/min and 400 m/min.

BRIEF DESCRIPTION OF THE DRAWINGS

The present invention may be illustrated by reference to the drawings in which

FIG. 3 is a side view of another edge guide useful in the present invention, and FIG. 4 is a cross-sectional representation of the edge guide of FIG. 3 viewed at A—A.

DESCRIPTION OF THE PREFERRED EMBODIMENTS

Figure 1:
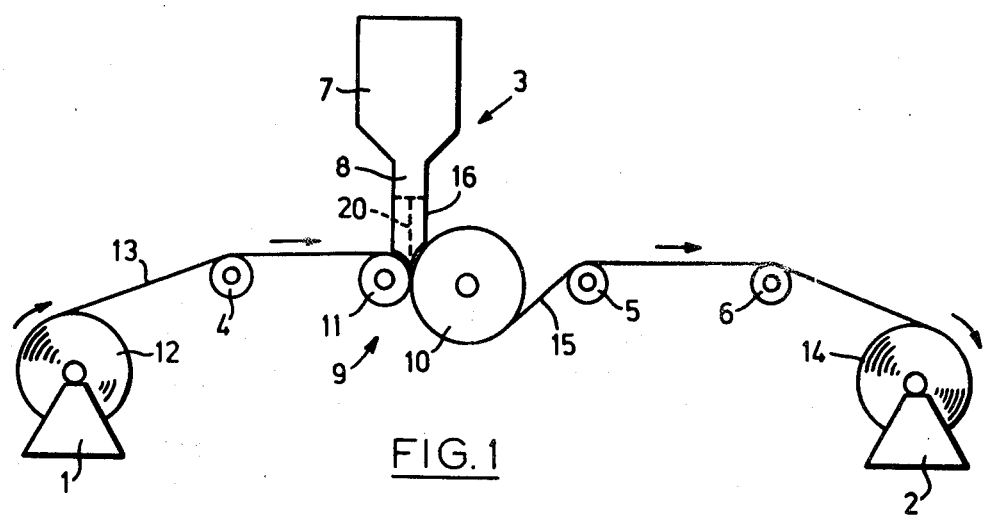
FIG. 1 is a schematic representation of a process of the present invention.

Apparatus which may be used in the present invention comprises an unwind stand 1, a rewind stand 2, a coating station 3 therebetween, and several idler and/or tensioning rollers, e.g., 4, 5 and 6. The coating station comprises an extruder 7 having a slotted die 8, situated at a position just above a nip roll assembly 9 which comprises a chill roll 10 and a nip roll 11.

The unwind stand 1 is adapted to hold a roll 12 of substrate web 13 and to tension said web 13 as it is pulled from the roll through the nip roll assembly 9. The rewind stand 2 is adapted to hold a roll 14 of coated web 15, and to wind coated web 15 thereon after passing the nip roll assembly 9.

Edge guides 16 and 16a are positioned at the extremities of slotted die 8.

Figure 2:
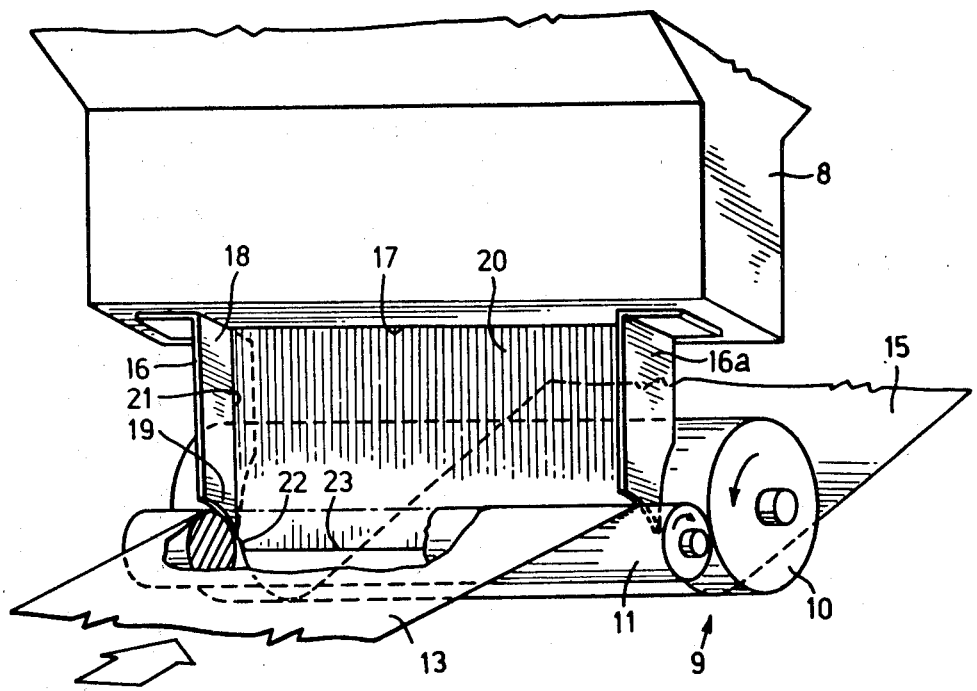
FIG. 2 is a cut-away perspective view of a coating station comprising a slotted die with film edge guides attached, and a nip roll assembly.

FIG. 2 shows the coating station 3 in more detail. The slotted die 8 has a slot 17 therein through which molten polymer may be extruded. At each end of the slot 17 there is an edge guide 16 and 16a attached to the bottom face of the slotted die 8. Each edge guide, e.g., 16, has one face 18 extending essentially transversely to and perpendicularly away from slot 17. The tip 19 of edge guide 16, furtherest away from the die 8, is shaped such that it will fit into the throat of nip roll 11 and chill roll 10. In order to provide more flexibility of operation, it will be understood by those skilled in the art that the length of the slot 17 may be shortened using deckle rods (not shown) and the edge guides repositioned accordingly.

Referring to FIGS. 3 and 4, the edge guide 16 may be made from two oblong blocks, one of which functions as the edge guide having flat face 18, and the other of which functions as attachment means 24. Attachment means 24 has two bolt holes 25 and 26 drilled therethrough for attaching edge guide 16 to the slotted die 8 or to the deckle rod (not shown) referred to hereinabove. The tip 19 of the edge guide is contoured as shown at edges 27 and 28 so that the tip may be positioned in the throat of the nip roll assembly 9. Edge 27 is in the shape of an arc of a circle having a radius slightly larger than the radius of nip roll 11, to which it is positioned in close proximity. Edge 28 is shaped to clear chill roll 10 when edge guide 16 is in position. Edge 28 may be in the shape of an arc having a radius larger than the radius of chill roll 10, but more conveniently, it is straight, as the chill roll usually has a large radius compared to that of the nip roll. The radius of the arc of edge 27 is normally about 0.1 cm to 1.0 cm, and preferably 0.2 cm to 0.5 cm larger than the radius of nip roll 11.

Edge guide 16 may have a thermocouple well 29 drilled or otherwise formed therein. Edge guide 16 may also have means for heating. Such means is conveniently provided by inserting a rod-type heating element (not shown) in heater well 30. Heater well 30 may be drilled from tip 19 into the body of edge guide 16, with a side channel 31 connected to heater well 30 and opening onto a face of edge guide 16 other than flat face 18. Side channel 31 is provided for permitting electrical wires (not shown) attached to the heating element to protrude from the edge guide for connection to a suitable source of electricity. Hole 32 and threaded pin well 33 or similar means are provided near the tip 19 of the edge guide across heater well 30, so that a pin (not shown) may be inserted therein to retain the heating element in heater well 30.

The need for providing supplemental heat to the edge guides through incorporation of heaters will depend on the temperature of the extrusion die, the thermal conductivity of the edge guides, the mass and shape of the edge guides and the mode of positioning the edge guides, among other factors, which will be understood.

Referring again to FIG. 2, the molten sheet of polyethylene 20, which is extruded through die sheet 17, adheres to edge guide 18 along edge 21. After leaving the edge guide, the edge of the polyethylene layer tends to neck-in, as shown at 22 prior to meeting substrate 13 along contact line 23.

Edge guides which may be used in the process of the present invention include bars, plates and swinging guides as shown, for example, in U.S. Pat. No. 3,456,293, to de Smedt et al. Plates or bars as shown, for example, in FIGS. 2, 3 and 4, are preferred, however, as they allow the edge of the molten polymer sheet to self-adjust its position quickly, as processing conditions change, e.g., substrate speed, melt temperature. At processing speeds usual in extrusion coating processes, wire guides are not sufficient, as the polyethylene sheet in contact with the wire tends to blob, causing an unevenness in the edge of the coating of the coated web.

It will be understood by those skilled in the art, that the extent of neck-in of an extruded polymer sheet depends, to a degree, upon the distance of freefall between the point where the molten sheet leaves the edge guide and the substrate. In the present process, it is desirable, therefore, to ensure that the distance between the points where the molten sheet leaves the edge guide and meets the substrate is constant, no matter at what speed the substrate passes the coating station. Conventional extrusion coating apparatus are usually constructed in such a manner that the extruded molten polymer sheet meets the substrate while the substrate is in contact with the nip roll. In the present invention, one method of keeping to a minimum the free-fall distance of the edge of the molten sheet, is to contour the tip of the edge guide to follow the curvature of the nip roll. In order to minimize necking-in during the period of free-fall, it is desirable to minimize the distance between the contoured surface at the tip of the edge guide and the substrate, and hence, the nip roll.

The distance between the contoured surface at the tip of the edge guide and the nip roll is preferably between 0.1 cm and 1.0 cm, and more preferably, between 0.2 cm and 0.5 cm.

In an embodiment of the process of the present invention, a web of substrate 13 is transported from supply roll 12 to take-up roll 14, passing over idler roll 4, nip roll 11 and tension rolls 5 and 6. A thin layer of polyethylene 20, having a melt index between about 30 dg/min and about 100 dg/min, is extruded in sheet form onto substrate 13 from the die slot 17 at a position close to nip roll 11. The coated substrate 15 is nipped between nip roll 11 and chill roll 10. The chill roll causes the thin layer of coating material 20 to solidify and adhere to substrate 13. The thus-coated substrate 15, after passing over tensioning idler rolls 5 and 6, is wound up on take-up roll 14.

In the process of the present invention, it is necessary to use a polyethylene which will wet the edge guides at extrusion temperatures. It appears that those polyethylene resins having melt indices in the range of about 30 dg/min to about 100 dg/min have surface tension characteristics in the molten state which permit the molten polymer to cling to the edge guide. This contrasts with those polyethylene resins having low melt indices, conventionally used for coating, which do not appear to have the surface tension characteristics sufficient to cause adherence of the molten polymer to the edge guides. For reasons not understood, polyethylenes having low melt indices, e.g., 25 dg/min and below, and those having super high flow characteristics, i.e., having melt indices of about 110 dg/min and above, do not adhere sufficiently well to the edge guides. Also for reasons not understood, polypropylenes having melt flow indices, as measured by ASTM Procedure No. D-1238 Condition L, from about 10 to 90 dg/min, do not adhere to the edge guides even at slow extrusion coating speeds.

In the present process, the polyethylene used for coating may be admixed with other olefin polymers prior to extrusion. The polyethylene used for coating may also be admixed with other additives well-known in the art for improving the processing of the coating polyethylene, e.g., extrusion aids, or for modifying the properties of the coating on the coated web, e.g., inorganic fillers.

Using conventional polyethylene coating resins in conventional extrusion coating processes, it is usually necessary to trim the edge of the coated web by about 2 to 4 cm. When high melt index polyethylenes are used as coating resins in place of conventional coating resins, it may be necessary to trim the edge of the coated web by as much as 7 to 10 cm. Using the present process, however, the edge trim may be reduced to about 1 cm or less.

In the present process, the temperature of the edge guide must be above the melting temperature of the polyethylene coating resin. Failure to keep the temperature of the edge guides above the melting temperature of the coating resin may result in irregular flow of the extruded sheet at the edges. The temperature of the edge guide should be sufficiently high that even the tip of the edge guide is above the melting temperature of the coating resin. It is preferred that the edge guide temperature be about 50°–80° C. above the melting temperature of the coating resin. For example, where the melting temperature of the polyethylene is about 130° C. and the temperature of extrusion at the die lip is about 300° C., the preferred temperature of the edge guides is about 180° to 200° C.

While non-metallic edge guides may be used, metallic edge guides are preferred. Metals having relatively high conductivity are preferred for construction of the edge guides, e.g., copper, brass. For ease of manufacture and durability, however, harder metals, e.g., brass, are especially preferred. For ease of positioning the nip roll assembly prior to extrusion, it may be desirable to hinge the edge guides so that they may swing away from the molten sheet of polymer.

A large number of different types of substrate web may be used in the present invention. In general, those substrate webs which may be coated with conventional polyethylene resins may be used. Some of the materials to which polyethylene will not readily adhere are known to those skilled in the extrusion coating art, e.g., polyethylenes useful in the present invention will not readily adhere to polypropylene films or fabrics woven from polypropylene tapes. Many woven or nonwoven substrates may be used in the present invention; however, examples of woven substrates include fabrics woven from polyethylene tapes. Examples of nonwoven substrates include paper, paper-board, cardboard, and certain synthetic thermoplastic films, e.g., nylon film.

The coated substrate webs of the present invention may be used in a similar manner to conventional polyethylene coated substrate webs. Higher density polyethylene coatings tend to increase the stiffness of the substrate webs. Woven polyethylene tape fabrics coated according to the present invention may be used for tarpaulins, industrial sacks and other heavy duty applications. Paper-board coated according to the present invention may be used, for example, in making cartons for packaging liquids.

The following examples serve to illustrate the invention:

EXAMPLE I

A 45.7 cm wide web of kraft paper was transported beneath a 35.6 cm wide extrusion die having a die opening of 500 micrometers. The extrusion die slot was positioned about 12 cm above the passing web. Edge guides were placed at each end of the die slot. Each edge guide comprised a 13 mm thick by 38 mm by about 115 mm brass bar having one end contoured to sit in the throat of the nip rolls. The edge guides were shaped similarly to that shown in FIGS. 3 and 4 wherein the radius of edge 27 was 15 cm, and the edge 28 was at an angle of 30° to the longitudinal axis of the edge guide.

The nip roll had a diameter of 13.4 cm and the chill roll a diameter of 25.6 cm. A variety of olefin resins were extruded through the extrusion die slot onto the paper web which was transported through the nip roll assembly at speeds of between about 30 m/min and 60 m/min. The extrusion rates of the polyolefin resins were adjusted to give a coating thickness of about 25 μm on the kraft paper.

The types of polyethylene resin, certain properties of these resins, and the results obtained are shown in Table I. The column headed "Neck-in without Guide" shows the neck-in of the molten polymer sheet at each side of the sheet when edge guides were not used.

TABLE I

| Polyethylene | Melt Index (dg/min) | Density (g/cm³) | Neck-in without Guide (mm) | Remarks |
|---|---|---|---|---|
| A | 0.40 | 0.960 | 50 | Did not wet guide |
| B | 4.0 | 0.923 |  | Did not wet guide |
| C | 4.5 | 0.923 | 28 | Did not wet guide |
| D | 6.5 | 0.917 | 16 | Did not wet guide |
| E | 12.0 | 0.921 |  | Did not wet guide |
| F | 20.0 | 0.924 | 40 | Wetted guides but broke away at moderate speeds (60 m/min) |
| G | 25.0 | 0.960 |  | Did not wet guide |
| H | 50.0 | 0.950 | >75 | Operated well |
| I | 53.0 | 0.924 | 50 | Operated well |
| J | 65.0 | 0.959 | >100 | Operated well |
| K | 73.0 | 0.930 | >75 | Operated well |
| L | 111.0 | 0.964 |  | Adhered to edge guides at 30 m/min, but broke away at 60 m/min |

Polyethylenes A, C and D were commercially available polyethylene extrusion-grade coating resins. From Table I it will be seen that with polyethylenes having melt indices of 25 and below, edge guides gave no relief to the problem of necking-in at the higher speeds, and in only one case (Polyethylene F) were the edge guides wetted at low speeds.

Polyethylenes H to K, having melt indices between 50 and 73, adhere to the edge guides, making the processes suitable for coating the paper web. Polyethylenes G to K have heretofore been thought unsuitable for use as coating resins, primarily because of the extent of necking-in that such resins exhibit. In all cases where use of the edge guide was successful, neck-in was reduced to about 10 mm.

Polyethylenes A and G were linear homopolymers; polyethylenes F, H, I, J, K and L were linear copolymers of ethylene and butene-1; and polyethylenes B, C, D and E were so-called high-pressure polyethylenes.

The results for polyethylenes A to G and L illustrate that there is a "window" with respect to melt index of polyethylenes suitable for use in the present invention.

Attempts were made to coat the kraft paper web with polypropylene resins. The results of such attempts are shown in Table II.

TABLE II

| Polypropylene | Melt Flow Index | Density | Neck-In without Guide mm | Remarks |
|---|---|---|---|---|
| A | 13 | 0.910 |  | Did not wet guide |
| B | 30 | 0.902 | 45 | Did not wet guide |
| C | 40 |  | 100 | Did not wet guide |
| D | 45 | 0.902 | 50 | Did not wet guide |
| E | 60 | 0.910 |  | Adhered to edge guide at 30 m/min, but broke away at 60 m/min |
| F | 90 | 0.900 |  | Did not wet guide |

Polypropylenes A and B are commercially available polypropylene coating resins. The results in Table II show that the use of edge guides gives no relief to the problem of necking-in of polypropylenes when used in coating processes.

EXAMPLE II

Polyethylene resins H, I and K of Example I were used to coat a fabric woven from polyethylene tapes, at speeds of up to 213 m/min. The woven web was 150 cm wide, the die slot was 145 cm long and 500 μm wide; and the edge guide, which was substantially as shown in FIG. 2, was made from copper. The copper bar forming the edge guide was 1.0 cm by 5.0 cm stock, and the area of the face next to the polymer sheet was about 50 cm². The edge guide was similar in shape to that shown in FIG. 3; and the distance between the contoured edge of the edge guides and the nip roll was adjusted to about 0.5 cm. The nip roll was 14.5 cm in diameter, while the chill roll was 61 cm in diameter and internally cooled with water at about 17° C. The web travelled over an arc about 2 radians of the nip roll. The vertical distance between the die slot and the nearest portion of the surface of the nip roll was about 7 cm.

The flow of polyethylene was adjusted to give a coating thickness of about 25 μm.

The polymer melt of each of the three polyethylene resins wetted the guide properly and adhered to the guides while traversing the air gap from the die lip to the nip roll, and the process appeared to be stable. Adhesion to the guides established itself quickly after numerous shutdowns and startups and the melt sheet did not separate from the guides even when disturbed by passing fly sheets under the guides. As is known in the art, fly sheets of paper are placed on the substrate web prior to coating so that the coated fly sheet subsequently can be removed for measurement of the coating thickness. The coated edge was straight and free of blobs. Neck-in of the molten sheet after leaving the edge guide was about 0.5 cm.

I claim:

1. A process for coating a substrate web with a polyethylene in which process the polyethylene, having a melt index of between about 30 dg/min and about 100 dg/min, is extruded through a slot in a slotted die in the form of a sheet having two edges onto the substrate web being transported past the slotted die, to form a coated web; and subsequently the coated web is passed through a nip roll assembly comprising a chill roll and a nip roll which form a throat therebetween, said slot at the extremities thereof having edge guides which are maintained at a temperature higher than the melting temperature of the polyethylene and are adapted to guide the two adhered edges of the extruded sheet into the throat of the nip roll assembly.

2. A process according to claim 1 in which the polyethylene has a melt index between about 50 dg/min and about 85 dg/min.

3. A process according to claim 2 in which the polyethylene has a melt index between about 50 dg/min to about 75 dg/min.

4. A process according to claims 1, 2 or 3 in which the polyethylene is selected from the group consisting of homopolymers of ethylene and copolymers of ethylene and a higher alpha-olefin, or mixtures thereof.

5. A process according to claims 1, 2 or 3 in which the polyethylene is a copolymer of ethylene and a $C_4$-$C_{10}$ alpha-olefin.

6. A process according to claims 1, 2 or 3 in which the edge guides each have a surface substantially transverse and perpendicular to the slot in the slotted die, with said surfaces facing one another.

7. A process according to claim 1 in which the edge guides each have a surface extending substantially transversely to and perpendicularly from the slot in the slotted die, with said surfaces facing one another, and in which each edge guide has a surface which is contoured to follow the curvature of the nip roll.

8. A process according to claim 7 in which the distance berween the contoured surface at the tip of the edge guide and the nip roll is set at between 0.1 and 1.0 cm.

9. A process according to claims 1, 7 or 8 in which the substrate web is transported past the slotted die at a speed greater than about 200 m/min.

10. A process according to claim 9 in which the substrate web is transported past the slotted die at a speed between about 200 m/min and 400 m/min.

* * * * *